United States Patent [19]

Drebin et al.

[11] Patent Number: 4,835,712
[45] Date of Patent: May 30, 1989

[54] METHODS AND APPARATUS FOR IMAGING VOLUME DATA WITH SHADING

[75] Inventors: Robert A. Drebin, Corte Madera; Loren C. Carpenter, Novato, both of Calif.

[73] Assignee: Pixar, San Rafael, Calif.

[21] Appl. No.: 896,944

[22] Filed: Aug. 15, 1986

Related U.S. Application Data

[63] Continuation-in-part of Ser. No. 851,776, Apr. 14, 1986, abandoned.

[51] Int. Cl.$^4$ .............................................. G06F 3/14
[52] U.S. Cl. .................................................... 364/518
[58] Field of Search ................ 364/200, 900, 568, 521

[56] References Cited

U.S. PATENT DOCUMENTS

| | | | |
|---|---|---|---|
| 4,649,499 | 3/1987 | Sutton et al. | 364/518 |
| 4,685,070 | 8/1987 | Flinchbaugh | 364/518 |
| 4,692,878 | 9/1987 | Ciongoli | 364/568 |
| 4,698,778 | 10/1987 | Ito et al. | 364/518 |
| 4,706,205 | 11/1987 | Akai et al. | 364/518 |
| 4,720,803 | 1/1988 | Ishii | 364/568 |
| 4,730,261 | 3/1988 | Smith | 364/518 |

Primary Examiner—Gareth D. Shaw
Assistant Examiner—John G. Mills
Attorney, Agent, or Firm—Hecker & Harriman

[57] ABSTRACT

Method and apparatus for shading an image volume so that surfaces and boundaries may be rendered to sub-voxel accuracy. A gradient vector is generated for each voxel of an image volume by calculating the change in opacity across that voxel in relation to its immediate neighbors. The gradient in the X, Y and Z direction of a three-dimensional voxel array is used to define a gradient length. By multiplying the RGBA values of individual voxels by their gradient length, a image volume may be shaded so that surfaces remain, but the interiors of solids are rendered more transparent revealing additional detail. Surfaces are shaded by multiplying the RGBA values of each voxel by a shading function. A reference point for a light source illuminating the displayed image volume is defined. A light vector is chosen for each voxel, a shading function is then generated based on the angle between the gradient vector and the light vector. The shading function allows for inputs for backlighting and side lighting.

14 Claims, 6 Drawing Sheets

COMPUTATION OF COLOR PROJECTED THROUGH CONCATENATED FILTERS A, B, C, D, E ONTO DISPLAY PIXEL

FILTER COMPONENTS

| FILTER | RED | GREEN | BLUE | OPACITY |
|---|---|---|---|---|
| A | .03 | .24 | .06 | .30 |
| B | .10 | .14 | .02 | .2 |
| C | .36 | .54 | .27 | .9 |
| D | .0125 | .05 | .0375 | .25 |
| E | .28 | .04 | .04 | .40 |

COMPUTATION OF SUCCESSIVE CONCATENATED FILTER OVERLAYS

D OVER E = D + .75E = (.22, .08, .07, .55)

C OVER DE = C + .1DE = (.38, .55, .28, .955,)

B OVER CDE = B + .8CDE = (.40, .58, .24, .96,)

A OVER BCDE = A + .7BCDE = (.31, .65, .23, .97)

METHODS AND APPARATUS FOR IMAGING VOLUME DATA WITH SHADING

This application is a continuation-in-part of application Ser. No. 851,776 filed on Apr. 14, 1986 now abandoned.

BACKGROUND OF THE INVENTION

In a wide variety of modern applications, it is desirable to observe the three dimensional coherence of a volume or object of interest. In the case of imaging real three dimensional ("3D") solids, ordinarily it is only possible to view discrete planar cross sections of the 3D volume and its contents. It is not possible typically to view 3D volumes such that internal and object surfaces, boundaries, interfaces, and spatial relationships within the volume can be separated and identified visually.

In medical imaging, for example, it is highly desirable to be able to visualize anatomical structures by three dimensional representations on computer graphic displays. The ability to produce accurate, volumetric, anatomical models from computerized tomographic (CT) scans is extremely valuable as a surgical aid, (such as for displaying structures to plan surgical intervention, or to represent details of the anatomical structure without the need for exploratory surgery). Thus, the 3D shape, size and relative position of pathologic structures provides important data for surgical planning, diagnosis and treatment.

Computer simulation of real 3D volumes depends on the ability to reconstruct 3D structures from planar section data, such as CT scans. These and other scans provide data from which a 3D density image volume consisting of volume elements (voxels) is available as input data for image processing. Unfortunately, such input image volumes are typically of low resolution as compared to the level of detail desired to represent accurately the sampled volume.

For example, in CT scan image volumes, voxels represent x-ray attenuation or other image volume data throughout the volume, including across surface boundaries. Although a voxel is assigned only a single "homogenous" value, in fact there exists a boundary and discrete materials on either side of the boundary within the object under consideration. Thus, a voxel along an edge is a sample extending over both sides of the edge. Further, if a material (such as a bone) is less that one voxel wide, the voxel that provides boundary information about that bone is very low resolution. Thus, the boundary shape within a voxel is not readily determined.

Various approaches have been used in an effort to approximate surface boundaries within volumes. One well known method is "thresholding". In thresholding, voxels that cross a boundary are classified as being composed of one or the other material type on either side of the boundary. The projected visible boundary thus becomes the binary classified voxel border.

The larger the voxels, the greater the error that is introduced by thresholding. Further, for coarse images or images with high density and closely spaced surface boundaries, thresholding provides an even further degraded result, such that the resultant images become less and less accurate. Subsequent approximation techniques are sometimes used in an attempt to render a more accurate approximation from the thresholding result. However, attempts to approximate the unknown surface gives rise to a grossly inaccurate result since these approximations rely on the initial binary classification of the voxels.

It is also highly desirable to be able to view all the data within the volume simultaneously from selected stationary or rotating views; that is, to view into the center of a volume, and to detect objects and hidden surfaces within the volume (and therefore internal boundaries and surfaces). To do so, it is necessary to be able to see partially through interfering objects when desired (e.g., for bone surrounded by muscle, to be able to observe the bone as well as the muscle surrounding the bone). Prior art techniques for rendering volume elements force a binary decision to be made as to whether a pixel is made of a given material or not. A binary classification introduces aliasing (or sampling) errors as the continuous image function is not preserved. The error introduced by binary classification is introduced upon any attempt to reconstruct the original image volume from the classified volume. Because the reconstructed image can only have as many intensity levels as there are materials, material interfaces will be jagged and the intensities will not represent the original image function.

Further, it may be desirable to shade the volume data so that boundaries and surfaces may be determined more accurately. In addition, it may be desired to shade the surface of a projected image to give the impression that the image is illuminated by one or more sources of light. Such surface shading can also be used to emphasize and highlight selected areas of the displayed image volume.

SUMMARY OF THE INVENTION

The imaging system of the present invention provides apparatus and methods for projecting a two dimensional (2D) representation of three dimensional (3D) volumes where surface boundaries and objects internal to the volumes are readily shown, and hidden surfaces and the surface boundaries themselves are accurately rendered. Also, the two dimensional image produced is capable of having the same resolution as the sampling resolution of the input image volume of interest. This is accomplished through the implementation methods for determining "partial volumes" of voxels. Partial voluming provides for the assignment of selected colors and opacities to different materials (or data components) represented in an image data volume based on the percentage composition of materials represented in each voxel of the image volume. Unlike prior art systems, such as those that use thresholding techniques, the imaging of the present invention has a high degree of precision and definition that is independent of image volume on a per voxel basis.

An image volume representing a volume object or data structure is written into picture memory. A color and opacity is assigned to each voxel within the volume and stored as a red (R), green (G), blue (B), and opacity (A) component, three dimensional data volume. The RGBA assignment for each voxel is determined based on the percentage component composition of the materials represented in the volume, and thus, the percentage of color and transparency (based on 100% reference material color and transparency values) associated with those materials. Such voxels stored within the picture memory for the component channel volume are sometimes referred to herein as RGBA voxels.

Next, the voxels in the RGBA volume are used as mathematical "gels" or filters such that each successive voxel filter is overlayed over a prior background voxel filter. Through a linear interpolation, a new background filter is determined and generated. The interpolation is successively performed for all voxels (or groups of voxels, e.g., voxel scan lines) up to the front most voxel for the plane of view. The method is repeated until all display voxels are determined for the plane of view.

The present inventive method of reconstruction provides for the 2D projection of volumes where surfaces of objects within a discrete data volume can be detailed and displayed even where surfaces could not previously be found because image volume data is course or the sampling rate is low. The present invention provides for visualization of hidden surfaces within the volume such that all surface boundaries are clearly and accurately defined.

Thus, given a discrete sample data volume of a complex volume data set or object, and finding the percentage of composition of component materials for each voxel, it is possible to render complex images without initially being provided with specific information as to boundary location within each voxel. The present inventive method and apparatus thereby provides for viewing volumes without having a geometric model (but rather having only a 3D raster volume) such that it is possible to create a complex projection of the 3D volume, using partial transparency and color that can have the characteristics of a mathematical geometric solid model. Objects can be viewed which partially obscure other objects, and spatial relationships between objects can be accurately rendered.

The present inventive method of shading provides for the rendering of surfaces and boundaries to subvoxel accuracy. A three dimensional gradient at the center of each RGBA voxel is computed based on the opacity of neighboring voxels. The gradient volume consists of XYZL voxels, where the X,Y and Z components represent the change in opacity in each direction, and L is the length of the amplitude of the gradient. By multiplying each RGBA voxel by the length of its gradient, surfaces remain, but solid regions become more transparent.

In order to shade the surface of the displayed image volume, a source of light is chosen as being at a fixed point in space relative to the image volume. Light vectors L are defined extending from the light source to the center of each voxel in the image volume. A shading function is generated based on the angle of the gradient vector of each voxel and the light vector associated with each voxel. In the preferred embodiment of the present invention, the shading function includes user determined variables which allow for the addition of back lighting and side lighting to provide additional surface highlighting.

Other objects and advantages of the present invention will become more apparent upon a reading of the Detailed Description of the Invention in connection with the drawings.

BRIEF DESCRIPTION OF THE DRAWINGS

FIG. 12 is a flow chart setting forth the steps in implementing the present invention.

DETAILED DESCRIPTION OF THE INVENTION

Notation and Nomenclature

Figure 1:
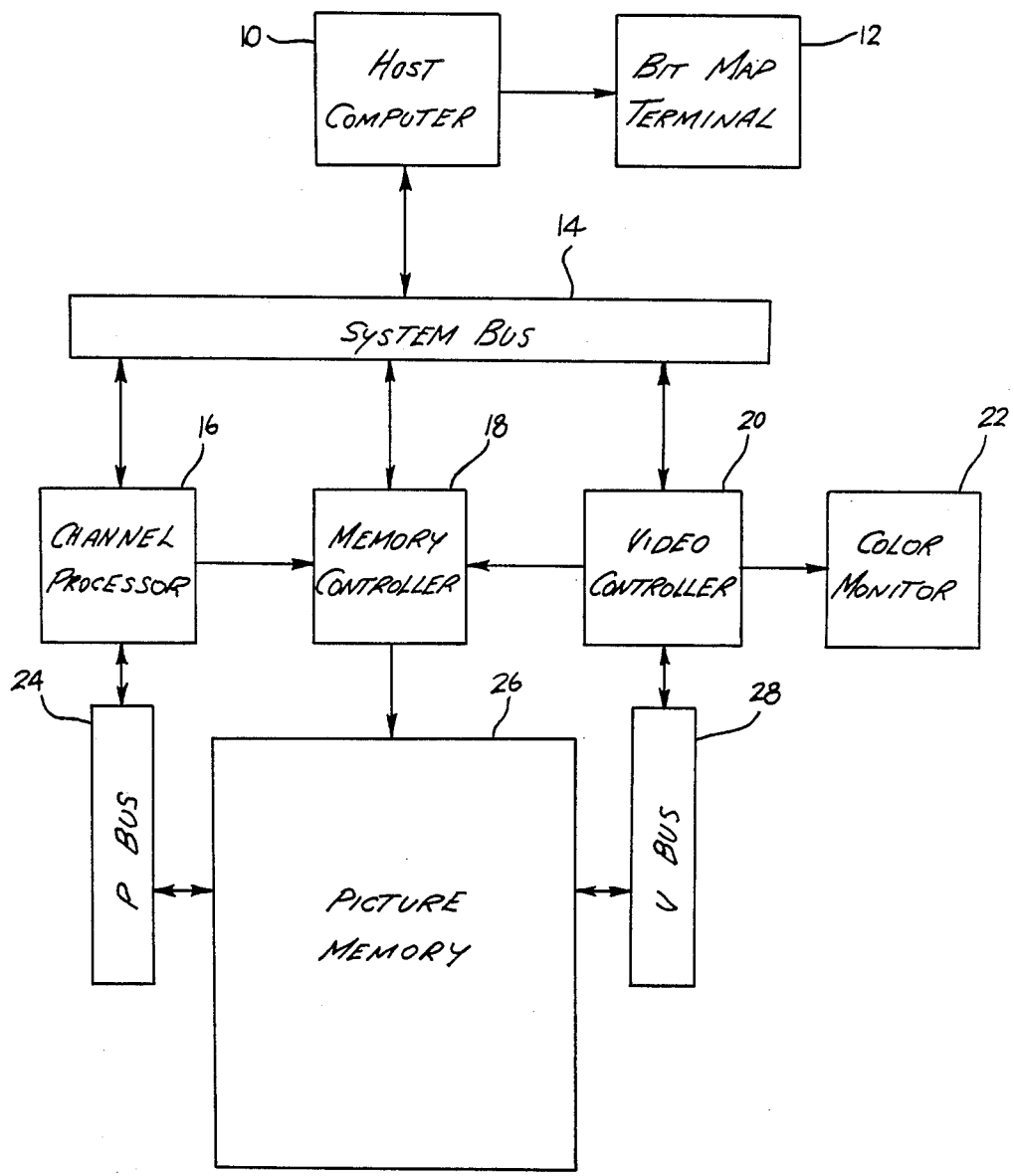
FIG. 1 is a block diagram illustrating the architecture of the present invention.

The detailed description which follows is presented largely in terms of algorithms and symbolic representations of operations on data bits within a computer memory. The algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be kept in mind, however, that all of these and similar terms are to be associated with the appropriate physical quantities and are merely convenient labels applied to these quantities.

Further, the manipulations performed are often referred to in terms, (such as adding or comparing) which are commonly associated with mental operations performed by a human operator. No such capability of a human operator is necessary, or desirable in most cases, in any of the operations described herein which form art of the present invention; the operations are machine operations. Useful machines for performing the operations of the present invention include general purpose digital computers or other similar devices. In all cases the distinction between the method of operations and operating a computer, and the method of computation itself should be noted. The present invention relates to methods for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with the teachings herein, or it may prove more convenient to construct more specialized apparatus to perform the required method steps.

While voxels are for purposes of convenience sometimes referred to as three dimensional elements having a three dimensional volume, it should be appreciated that voxels define points in a three dimensional space.

In addition, the following description, numerous details are set forth such as algorithmic conventions, specific numbers of bits, etc., in order to provide a thorough understanding of the present invention. However it will be apparent to one skilled in the art that the present invention may be practiced without these specific details. In other instances, well-known circuits and structures are not described in detail in order not to obscure the present invention unnecessarily.

System Architecture

The system architecture of the present invention is illustrated in FIG. 1. In the preferred embodiment, the image system comprises a host computer 10 coupled to a bit map terminal 12 and a system bus 14. The system bus 14 is coupled to a channel processor 16, a memory controller 18, and a video controller 20. The memory controller 18 is coupled to the channel processor 16 and video controller 20 and to a picture memory 26. The video controller 20 is coupled to the memory 26 via a video bus 28. Channel processor 16 is coupled to the picture memory 26 via a picture bus 24. A color monitor 22 or other ouput device is coupled to video controller 20.

The channel processor 16 comprises a parallel processing computer system. In the preferred embodiment of the present invention, four sixteen bit parallel processors are utilized in the channel processor. Although it has been found advantageous to utilize four parallel processors in the present invention, it will be obvious that any number of processors may be used without departing from the spirit and scope of the present invention.

The host computer 10 is coupled to a bit map terminal 12 which displays a plurality of menus available to the user of the present invention. In the preferred embodiment, the host computer 10 is utilized to manipulate the histogram generated from the image data stored in the picture memory 26. A look up table may be stored in the host computer 10 containing preassigned color and opacity values for each peak intensity location in a histogram. In addition, the host computer 10 may be utilized to display the histogram on bit map terminal 12 so that user defined color and opacity values may be determined.

In the present invention, the system bus 14 is a sixteen bit bus coupling the host computer 10 to the other components of the image processing system. Although sixteen bit parallel processors are utilized in the present invention, eight bit, thirty two bit, or any other size processor may be utilized as well. Thus, other bit size system buses may be utilized as required.

The video controller 20 provides vertical and horizontal synchronization to the color monitor 22 and also includes a buffer memory for displaying screen data. The video controller 20 accesses the video bus 28 during vertical blanking periods to provide updated information to the buffer memory. The video controller includes a digital to analog (d/a) converter to convert digital signals into a video signal suitable for display on the monitor 22. In addition, the controller 20 includes look up tables for each of the RGB channels. The twelve bit digital word of the red (R) channel, for example, is mapped out through a look up table and a unique red color value is outputted and displayed upon color monitor 22. As noted, there are look up tables for each of the channels R, G and B. The video controller 20 functions as a three value in—three value out converter, which allows gamma corrections. The video bus 28 in the preferred embodiment is a bus divisible in 12 bit units and operating at up to least 420 megabytes per second. The picture bus 24 in the preferred embodiment operates at 240 megabytes per second.

The color monitor 22 of the present invention may be any commercial color monitor having 480 to 1125 number of scan lines. The present invention has the speed and capability to service high resolution, high scan line monitors.

The picture memory 26 is a random access memory (RAM) utilized for storing the original image data as well as classification data, color and opacity data and the composite RGBA volume data. The picture memory 26 is shown in detail in FIG. 2. As previously noted, each voxel is represented by 4 twelve bit digital words. One portion of the memory, original volume memory 26a, stores the data in its original form. In the present preferred embodiment, approximately 40 million bits are dedicated for storage of original data. Original image volume data is stored as a series of twelve bit words where each word represents the intensity level of one voxel of the original voxel volume. After the RGBA volumes are generated, they are stored in RGBA volume memory 26b. Each color value is represented by a twelve bit word and the opacity value A is also represented by a twelve bit word. Thus, each voxel in the RGBA volume memory is represented by 4 twelve bit words. In the preferred embodiment of the the present invention, 150 millions bits of memory are dedicated to the RGBA volume memory 26b. The composite voxels are stored in the two-dimensional projection memory 26d. As noted previously, the combination voxels are generated from concatenation of various scan lines of the RGBA volume data. The picture memory 26 also includes temporary work space memory 26c, RGBA shaded volume memory 26e and XYZL gradient volume memory 26f. Although the number of bits in various portions of the picture memory 26 have been described, it will be obvious to one skilled in the art that any suitable number of bits of memory may be utilized in practicing the present invention.

Referring again to FIG. 1, memory controller 18 is utilized to arbitrate all accesses to the picture memory 26. Memory controller 18 enables data to be written into the picture memory 26 through means of picture bus 24.

Figure 3:
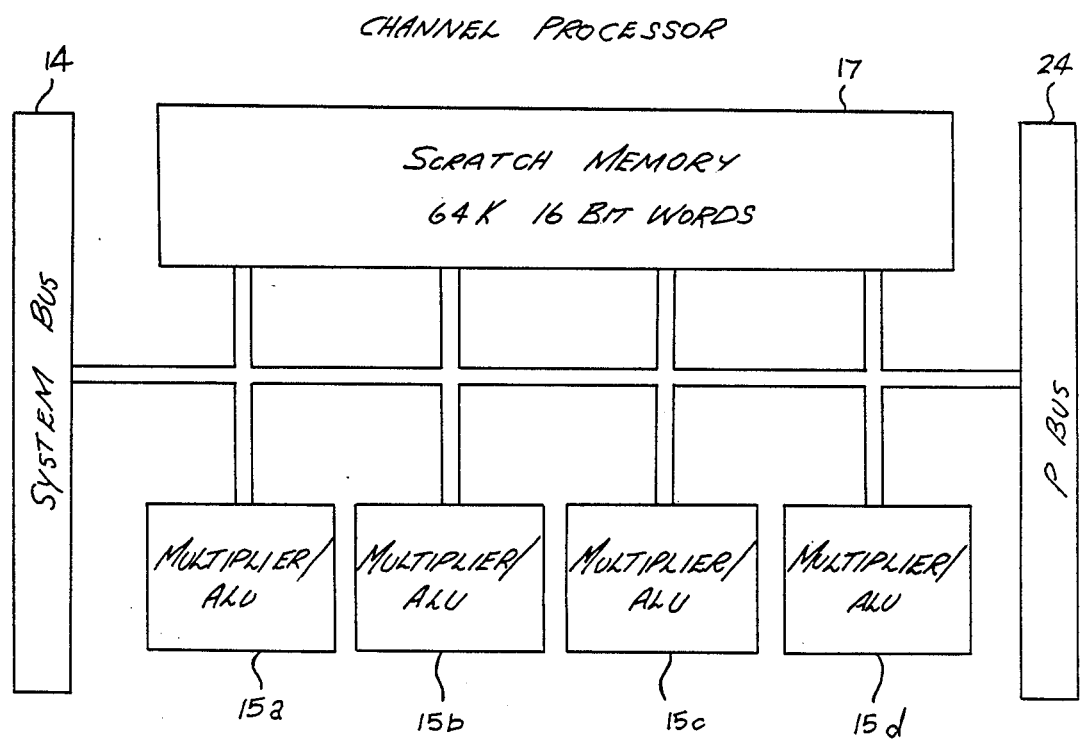
FIG. 3 is block diagram illustrating the architecture of the channel processor of the present invention.

Channel processor 16 is utilized to generate the histogram from which classifications of the voxels is made. Channel processor 16 is shown in detail in FIG. 3, and comprises scratch pad memory 17 and four multiplier/arithmetic logic units (ALU) 15a through 15d, respectively. In the preferred embodiment, scratch pad memory 17 includes 64K sixteen bit word memory locations. Channels processor 16 utilizes the scratch pad memory 17 for temporary storage of data for manipulation by the multiplier/ALU pairs. Each of the multiplier/ALU pairs 15a through 15d is dedicated to one of the four co-processors that comprise the channel processor. This parallel approach allows the same instruction to be executed on different data. Such a system is referred in the art as a single instruction, multiple data stream (SIMD) system. One such inventive system is more fully described in U.S. patent application Ser. No. 748,409, filed June 24, 1985, and owned by the assignee of the present invention. In the preferred embodiment, one channel is utilized for the R (Red) values of the voxels, one channel is utilized for the G (Green) values, one for B (Blue) and one for A (opacity) values.

The initialization of the processing system occurs when the original image volume data is read into the host computer 10. The original image data may be transmitted in a compressed form and require decoding and expansion. In addition, depending on the source of the data, the bits/pixel resolution of the raw data may not match the preferred twelve bit/pixel resolution of the present invention. Therefore, if required, the host computer or channel processor may artificially enhance the original image data to an acceptable resolution.

The host computer 10 then outputs a request signal on the system bus 14 requesting the channel processor 18 to allow the original image data to be written into the picture memory. The host computer 10 then outputs the original image data onto the system bus 14 into the channel processor 16. The channel processor 16 then outputs the original image data onto the picture bus 24 where it is written into the original image volume memory 26a of the picture memory 26.

If desired, or necessary the original image volume is then classified by the channel processor 16. A scan line from the original volume memory 26a is then placed on the picture bus 24 and inputted to the channel processor 16. The channel processor 16 counts the number of voxels at each intensity level of the 2,049 definable intensity levels to generate a histogram, the channel processor 16 may then classify the peaks pursuant to previously defined look up tables or a program hierarchy. Additionally, the histogram may be displayed by the host computer 10 on the bit map terminal 12 so that the classification may be manually performed by a user.

After classification, the classification data is sent through system bus 14, to the channel processor 16, and in particular to the scratch pad memory 17. The channel processor computes a plurality of lookup tables based on classification data from the host. The scratch pad memory 17 contains a plurality of look up tables so that RGB and opacity values may be assigned to the classified voxels. The channel processor 16 requests one scan line (a one dimensional array of voxels) at a time from the memory controller and processes the scan line through the stored look up tables. The input to the channel processor look up tables is a monochrome scan line and the output is an RGBA classified scan line. The scratch pad memory 17 of the channel processor 16 includes at least three buffers, namely a scan line buffer, a look up table, and an output buffer for output classification. Although described in conjunction with look up tables, any suitable method of assigning or generating color values may be utilized in the present invention.

The output from the output buffer is coupled through a picture bus 24 to the RGBA volume memory 26b of picture memory 26. Each slice of the original image volume is stored as an array in the RGBA volume memory 26b. The "concatenated filtering" of the present invention is performed by the channel processor 16. A background image volume is initially read into the scratch pad memory of the channel processor one scan line at a time. As each succeeding image volume is read into the channel processor 16, the RGBA values are concatenated by the multiplier/ALU Units 15a–d respectively. This composite image volume is stored in the projection memory 26d of picture memory 26.

To display the composite image, the contents of memory 26d is outputted onto the video bus 28 into the video controller 20. The digital data stored in the projection memory 26d is converted to video analog data by the controller 20 and outputted to color monitor 22 where it is displayed in a raster scanning fashion.

Partial Volumes

Classification

An image volume, that is, a volume of picture elements (voxels) representing a three dimensional image, is read into host computer 10 and, after any required decoding or decompression, into original image memory 26b of picture memory 26. Thus, the object(s) under consideration, an array of two dimensional arrays, can be thought of and mathematically represented as as a three dimensional ordered array in picture memory. The image volume may be an unprocessed image array that may be obtained by various methods known in the art.

While the present invention has wide application, it is described for purposes of example in connection with the three dimensional display of computed tomographic ("CT") images. Input image volume data, represented as an ordered CT image volume array in this context, may be obtained from a variety of tomographic imaging methods, e.g., x-ray computed tomography, ultrasound sector scanning, nuclear magnetic resonance, etc. In other contexts, the image volume input data may be obtained using other imaging methods, such as seismic imaging, or the result of computer model or simulation, (such as a fluid flow simulator), for example. The image volume in the present example is stored as an ordered array of 2D images where each image is a 2D ordered array of 12 bit numbers.

The CT scan or other image volume provides monochromatic grey scale input data to the image processing system of the present invention. This CT input image volume data is stored in the initial volume memory 26(a) of picture memory 26 as an ordered array of 12 bit binary numbers, each representing a given CT scan or other image volume data (voxel). In the present example, the image volume information which is provided by the CT scan input represents information about four discrete materials in the anatomy under consideration; namely, air, fat, soft tissue, and bone.

Figure 4A:
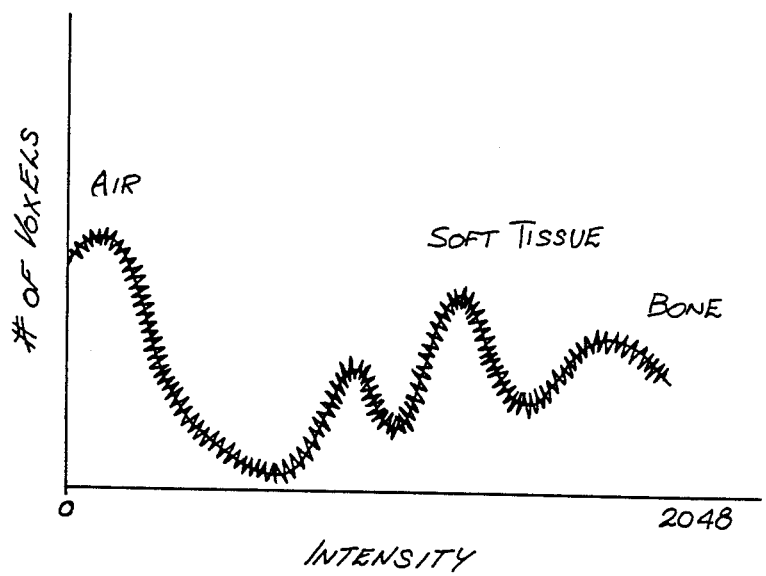
FIG. 4a is a graph showing a typical input data histogram.

In the present example, the intensity of the grey scale data depends on the x-ray density of the material represented from the original imaging method. Referring to FIG. 4(a), grey scale intensity data for each voxel is plotted in a histogram 30 that provides a distribution of the number of voxels in the image volume versus intensity. The histogram 30 is generated by the channel processor 16 from image volume input data and is transmitted to the host computer 10 via system bus 14.

The grey scale level histogram 30 is a function which shows, for each grey level, the number of voxels in the image volume that have a particular grey level. The abscissa 32 is grey level intensity, shown in this case to be from 0 to 2048. The ordinate 34 is frequency of occurrences (e.g., number of voxels of the image volume at each intensity). Thus, the area under the histogram curve 36 represents the total number of voxels in the image volume.

The histogram 30 is derived from a particular image which, in the present example, corresponds to the twelve-bit pixel information of the CT scan. The resulting histogram is then filtered by the host computer 10 to remove noise, (i.e., to supress high-frequency variations while preserving the shape of the input function), using low pass filtering techniques widely known in the art and results in a smoothed histogram curve as shown in FIG. 4a.

In the prior art imaging systems, all voxels are classified as representing 100% of single material. Thus, using prior art techniques, a binary classification is made for each voxel, in which all voxels within a particular intensity region are classified as one or the other of those materials represented by the input volume image data. Using prior art techniques for the present CT scan example, voxels would be classified as either bone, fat, tissue or air. In the prior art, a threshold grey level is chosen as a cutoff at some point between histogram peaks. All voxels within a given intensity range are thereby categorized either 100% air, soft tissue, bone or fat. This information is then stored in memory as a two bit or one bit value.

For CT renderings, this binary classification is suitable for peak regions of the histogram where a voxel content clearly falls within one discrete material classification or another. However, such "hard" classification requires that a discrete binary determination be made concerning the material classification of all voxels within the image volume.

For example, in the prior art, at surface boundaries (such as at an interface where tissue is attached to bone), a voxel crossing an edge location is classified as either bone or tissue. Thus, where voxels cross between surfaces or along edges, or where the local material is less than 1 voxel wide, the edge or surface boundary will be lost, and an imprecise rendering will result. Such binary value assignment, therefore, introduces significant aliasing error, resulting in a surface rendering that is inaccurate.

In the present invention, voxels are classified, in accordance with their associated intensities, as being composed of between 0% and 100% of each material type represented in the image volume.

Figure 4B:
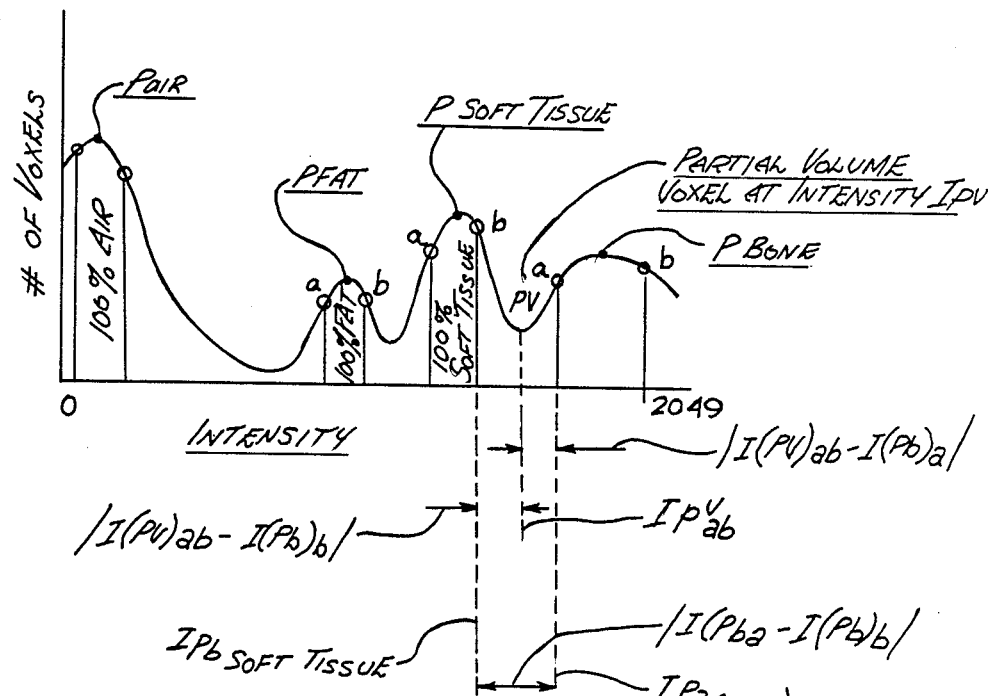
FIG. 4b is a graph illustrating classification of a CT input data histogram.

Referring to FIG. 4b, significant peaks P and troughs T are identified in the histogram 30. An intensity range 40 characterized as 100% of a material is determined for all voxels falling within a selected intensity range to the left and right of significant histogram peaks P. In the present embodiment for a CT scan, this range is determined by a linear approximation. The 100% material range is approximated as all voxels P falling within the intensity band defined as $|p-t|/4$ where p is the intensity associated with a significant peak P and t is an intensity associated with an adjacent significant trough T. All voxels within this range on either side of a given significant peak P are classified as being a 100% "pure" material value. Thus, in the present example, all voxels within these ranges are categorized as 100% fat, air, soft tissue, and bone, respectively. Voxels outside these intensity range values are categorized as containing image information representing some percentage of the "pure" materials to the left and to the right of the voxels. Therefore, they are combination material voxels each having a partial percentage composition of these materials.

For convention, voxels classified as being composed of less than 100% of any single material are referred to as partial volumes in connection with the present invention. Further, voxels classified as 100% of one material are sometimes referred to as such. However, in more general terms, utilizing the present invention, classification is based on partial volume determination. Thus, as a more general convention, all classified voxels are "partial volumes", where voxels classified as a single homogenous material are "partial volumes" having 100% of one material, and 0% composition of other component materials.

In determining partial volume classification, the percentage of each material contained in voxels falling outside the 100% material intensity ranges is found. In the present preferred embodiment, the percentage voxel material content is determined by performing a linear interpolation for voxels having intensities falling between the limits of adjacent 100% material intensity values. A ratio is then found of: (1) the intensity differences from a 100% value boundary to the voxel intensity under consideration (numerator) versus (2) the intensity range value between surrounding 100% material value limits (denominator). This ratio provides the percentage voxel composition for each adjacent material at a particular intensity value between 100% value ranges.

Referring now to FIG. 4b, partial volume percentages are determined by the channel processor calculation performed for all partial volume voxels by a linear interpolation for each intensity between adjacent 100% material intensity value limits. Alternatively, classification may be made pursuant to values located in a look-up table or made pursuant to inspection and user determined values. In the present preferred embodiment, for a given voxel associated with partial volume intensity I(pv), its percentage composition is:

$$\text{fraction of material in voxel } PVab = \frac{|I(PV)ab - I(Pb)a \text{ or } b|}{|I(Pba) - I(Pb)b|}$$

where
PVab is the partial volume voxel(s) under consideration; I(PV)ab=intensity of partial volume voxels under consideration between 100% material intensity regions a and b; I(Pb)a=intensity at peak boundary value a for 100% material type; and I(Pb)b=intensity at boundary value b for 100% material type;

When calculating the fraction of material associated with boundary a, I(Pb)a is used; with boundary b, I(Pb)b is used. Thus, each voxel is classified as either; (1) a partial volume made up of a percentage of more than one image volume material type, or (2) a "pure" volume made up of 100% of one image volume material type.

In the present preferred embodiment, the classification of grey scale data is performed for a musculo-skeletal CT scan model. In this model, as shown in FIG. 4b, the relationship of material grey scale intensities is such that fat 40 is always adjacent to soft tissue 44; soft tissue 44 always surrounds fat 40 and also always surrounds bone 46. It should be appreciated, however, that other classification schemes can be used to determine percentage voxel material composition for other input data, such as for example, seismic image volume input data.

Also, such classification may be used for applications where input data includes material adjacencies in which multiple materials (and/or their associated histogram intensities) may be concurrently adjacent to each other and are so represented by image volume input data. Further, although straight line interpolation methods are described in the present example, other methods, (such as quadratic or cubic methods for example) may alternatively be used to calculate voxel partial volume percentages in the present preferred embodiment and in other embodiments.

Color and Opacity Assignment

In the present invention, a 2D color image of a 3D volume is constructed, based on a color representation of an image volume using "concatenated filtering" described below in the section on reconstruction. To construct such filters, color values (RGB) and an opacity value (A) is first assigned for each voxel of the image volume. Having classified all the voxels in the volume, and knowing their percentage material composition, a color (RGB) and opacity (A) may be assigned. In the present example of a color modeling scheme for CT image volume data, bones are opaque white; soft tissue is semi-transparent red; fat is a very transparent green; and air is completely transparent. A value, having red (R), blue (B), and green (G) components is assigned which represents the color value of each of these four materials. Further, an opacity (or transparency) value (a) is assigned for the selected transparency of each 100% pure material.

Knowing the assigned RGBA for each material type, an RGBA can be found for each voxel in the image volume based on its percentage composition. For example, if a voxel has been classified as 30% air and 70% fat, a "combined" RGBA can be found for this voxel, determined by the channel processor 16, by multiplying the RGBA of each material component in the voxel by its associated percentage material contribution, and then summing the results. The resultant RGBA becomes the RGBA of the voxel under consideration, which is red into RGBA volume memory 26b. Thus:

$$RGBA\text{voxel} = \sum_{i=0}^{i=W} (Wi)(Ci)$$

where
$W$ = contribution of material $i$ in the voxel; and
$C$ = color and opacity of material $i$; and $$\sum_{i=0}^{i=n} Wi = 1 \text{ where } n \text{ is the \# of component materials in the voxel}$$

The RGBA voxel assignment operation is performed for each voxel in the image volume under consideration, and these values are written into RGBA volume picture memory 26(b) and stored for later processing. Each RGBA voxel is represented as as an ordered cubic array of specific numbers in RGBA image memory 26b, each for an associated voxel of the image volume.

In prior art imaging systems, each voxel is typically assigned only a single material type and/or color value. All voxels in the volume were thus considered to be uniformly composed of one or other of the image volume material types. In contrast, in the present invention, a broad range of colors and opacities are determined and assigned based on a color and opacity blend that represents an associated percentage material contribution for each voxel. The RGBA assignments in the present invention are made by processing the classified voxels through R, G, B, A look up tables in the scratch pad memory 17 of channel processor 16.

Image Reconstruction

Having created an RGBA volume which is stored in RGBA picture memory 26, a 2D projection can be constructed for any selected view of the 3D volume wherein objects, which are not represented as mathematical solids or surfaces of the 3D volume, will provide the visible characteristics of 2D projections created from mathematical surface or solid models. This is accomplished using the concatenated filters of the present invention.

Figures 5, 7:
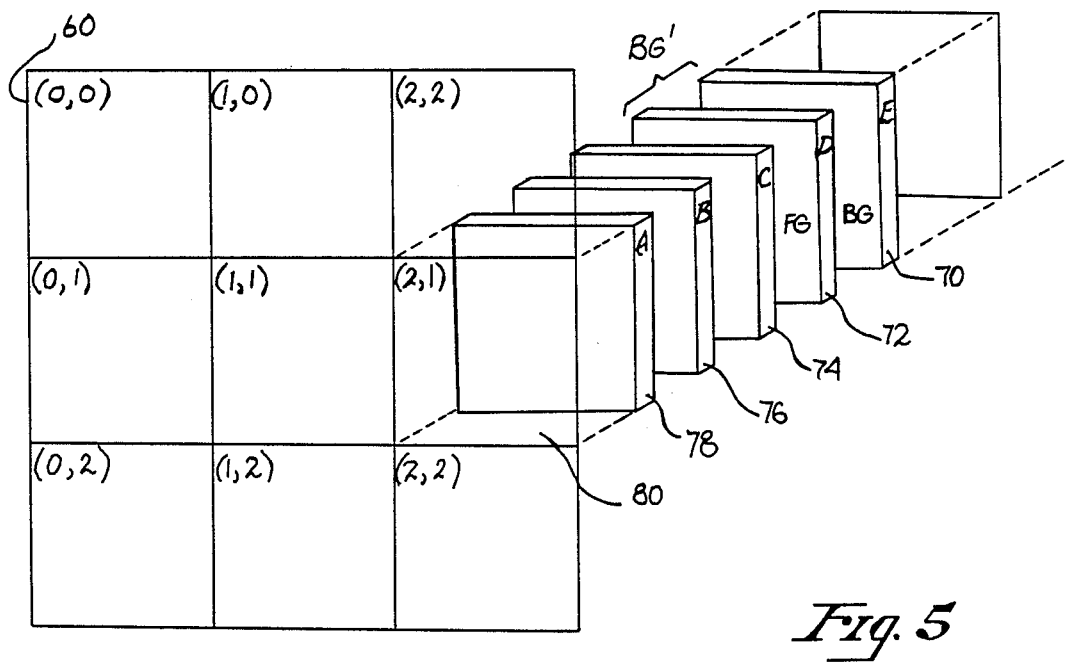
FIG. 5 illustrates a plurality of voxels used to generate a two dimensional display.
FIG. 7 illustrates the calculation of projected pixel output based on the concatenated filtering of the present invention.
Figure 6:
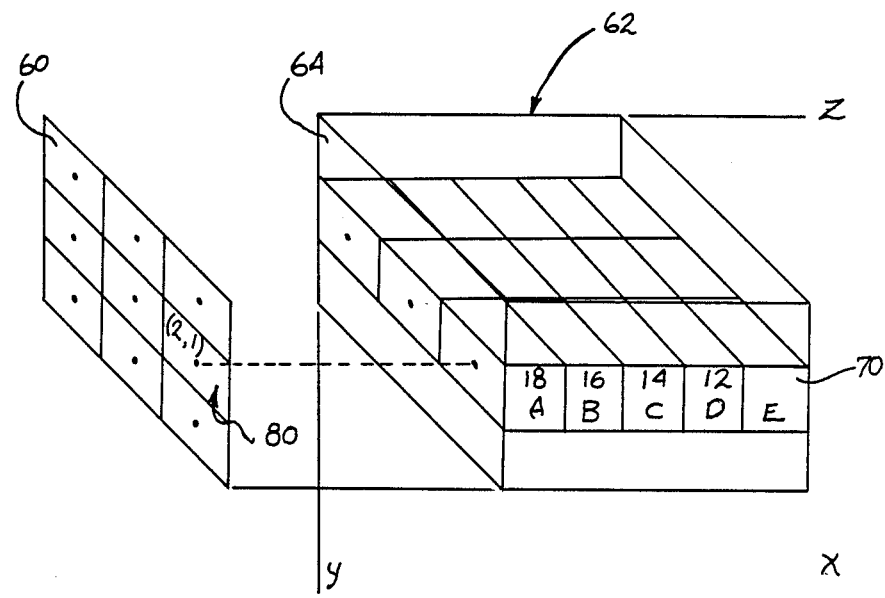
FIG. 6 illustrates image reconstruction for successive voxel scan lines and works.
Figure 6:
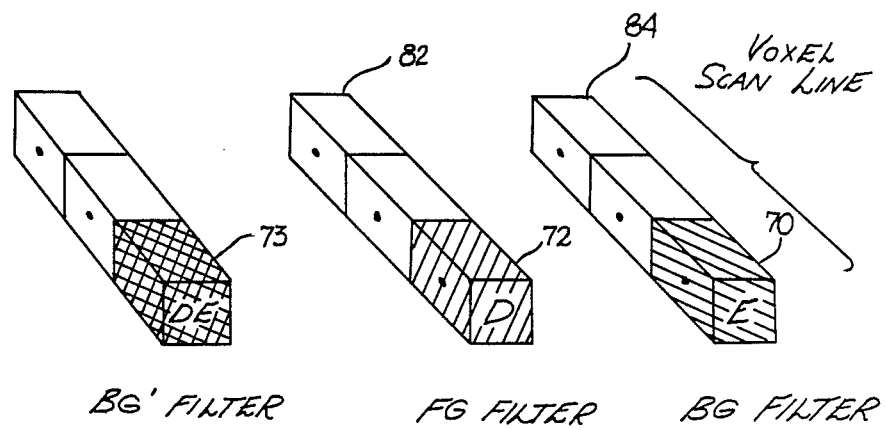

Referring now to FIG. 5, a local ordered 3×3 array of display pixels 60 is shown. The 3×3 display and 3×3×5 volume 62 shown in FIG. 6 is used for purposes of example in describing the present invention. In practice, the display may be a 1024 by 768 or other suitable raster scan display. Further, the RGBA volume is a 3 space data array representing an (x,y,z) image volume constrained only by input data and memory size. Each RGBA voxel operates as a color filter to create a composite 2D output, such as is shown in FIG. 5 associated for video display pixel (2,1).

The RGBA voxels, as filters, may be viewed as voxels "collapsed" along the z axis (i.e., the axis parallel to the line of sight) which provide a mathematical filter overlay. Each filter has a color and opacity, where color is represented by three components Red (R), Green (G) and Blue (B). Opacity is represented by a filter component (A). The opacity A of a filter determines how much of the voxels behind the filter will "show through" (i.e., contribute to the new, combined background element).

To project a two-dimensional pixel (x,y) to provide a view perpendicular to the XY plane, as shown in FIGS. 5 and 6, (thereby providing a selected view of the 3D volume at each local display pixel (x,y)), successively, the RGBA of each foreground voxel FG (e.g., 72) is mathematically overlayed over the RGBA of each background voxel BG (e.g., 70) to produce a new background RGBA voxel BG'. The RGBA values associated with voxel BG are read from picture memory and temporarily stored in scratch pad memory which operates as an BG filter buffer. Similarly, RGBA values associated with voxel BG are read from picture memory and stored in scratch pad memory, a portion of which operates as an FG buffer.

In the present preferred embodiment, the color projected through a column of two or more of concatenated filters is determined by the following equation:

$$BG' = FG + (1 - (FG) \times (AFG))(BG) \text{ where:}$$

$FG$ = the color and opacity components $\begin{matrix}R\\G\\B\\A\end{matrix}$ of the foreground filter;

$AFG$ = the opacity of the foreground filter;

$$BG = \begin{matrix} R \\ \text{the composite color and opacity } G \\ B \\ A \end{matrix} \text{ of all filters}$$

behind the foreground filter (i.e., the "current" background);

where FG×(A) represents the opacity of the foreground filter, i.e., the contribution of the foreground filter to the new background filter BG. The resultant new background value BG' is stored in scratch pad memory for successive calculations by the channel processor.

Thus, a new RGBA background filter BG is determined. The above calculation is then successively performed for each successive foreground filter FG and its associated new background BG until all filters extending to the selected projection plane of view 64 are considered, and a final RGBA projection pixel value is determined for display 60. This sequence is performed to determine all display pixels with respect to the selected 2D view plane 64 of the image volume 62 under consideration.

The present reconstruction method is not constrained by any particular processing sequence such as the pixel by pixel processing as just described. For example, in the presently preferred embodiment, referring to FIG. 6, image reconstruction processing is performed for successive voxel scan lines of the RGBA volume stored in picture memory 26b (that is, voxel strings, perpendicular to the 2D view plane 60 along horizontal slices 66 of the RGBA volume 62). Thus, successively, the RGBA of each foreground scan line FG is mathematically "overlayed" over the RGBA of each background scan line BG to produce a new background scan line BG'. The RGBA values associated with scan line FG are read from picture and temporarily stored in scratch pad memory. Similarly, RGBA values associated with scan line BG are read from picture memory and stored temporarily into scratch pad memory. The filter overlay calculation sequence is performed by the channel processor reading from scratch pad memory for successive associated BG and FG filters to create an RGBA composite scan line 68, which is then written to the video display output 64. Further, these operations are performed to determine all composite pixel projection display scan lines for the selected 2D view of the 3D volume under consideration.

Filtering is implemented by combining successive image volumes portions (one scan line at a time) through the multiplier/ALU units 15a-15d of the channel processor. One channel (multiplier/ALU) is used to filter the R values, and one for the G, B, and A values respectively and so on for the RGB values of each voxel. Filtering may be performed from back to front, or alternatively front to back with respect to the plane of view.

For example, FIG. 7 shows a color table for the RGBA voxels 70 through 78 operating as succesive concatenated filters to provide a projected display composite pixel, 2,1 of FIG. 5, also shown in FIG. 6. As can be seen from the table the RGBA components of each value of each filter is used to calculate a new BG' filter (which then becomes the BG value of the succeeding FG voxel) to provide a final pixel color at (2,1). Thus, successive calculations are performed in accordance with the concatenated filtering equation to compute the successive new background filter values which are then combined in accordance with the above equation to compute successive values with respect to each new foreground until a final pixel color value is determined. This value is then displayed (in this case with its associated display pixel (2,1)).

The composite 2D projection is then stored in display buffer 26d and outputted to raster scan display monitor 22. Of course, it should be appreciated that the composite may alternatively be outputted to a printer or other output device.

Thus, a two dimensional color projection of a 3D input image volume is produced. Other image processing may also be used on the resultant projection or intermediate volume data, such as rotation, translation, shading, stretching, shrinking, or the like.

The present invention can be used in a broad range of image processing contexts. It can be used for example, to render any data sets that can be modeled in 3D, such as data from voxel sampled volumes (e.g., CT scans), particular or general solution sets or computational results from equation sets or other data sets, which cannot be easily modeled because of their complexity. Further, the present invention may be applied to color data sets where the color of component materials in the volume is known. There, partial volume determination can be made in accordance with the present invention using an alternative means for classifying the data for percentage material contribution.

Thus, the present invention is not constrained to grey scale data sets, CT scans, real images, or the like. Rather it may be applied for any context in which there is determinable discrete volume samples where, for each sample (or voxel), material types within the data set (or differentiable data to represent or assign a material type) are known or can be found, such that percentage contribution can be found for each voxel in the data volume.

Partial volume percentage classification, while performed in the present example for CT scans using a histogram distribution, may be performed in various ways for other applications, without using a histogram, (i.e., such as spatially rather than statistically).

Image Shading

To further enhance visual images and to provide monocular depth cueing, it is desirable to accurately identify and render surface boundaries and surfaces from complex data sets. In the prior art, boundaries and surfaces are determinable only to a voxel accuracy. However, many data imaging applications, such as medical imaging, require that boundaries and surfaces be known to subvoxel accuracy. Using prior art techniques, thresholding schemes are imposed upon image volume data to define boundaries and surfaces. Such thresholding techniques invariably introduce aliasing. This results in inaccurate boundary and surface renderings. In prior art techniques surfaces and boundaries are imposed such as by using geometric modeling, which models are then shaded. These techniques introduce artificial data into the data set.

Because thresholding requires binary decisions about boundary and surface location, image data precision and boundary definition is degraded and lost. Since the resultant boundary is inaccurate. post-processing approximation typically is used in an attempt to "soften" the introduced error. Such aliasing cannot be eliminated by post-processing however. once introduced. Thus, still further error and false boundarying and shading will result.

In accordance with the present inventive method, accurate boundary and surface determination to sub-voxel precision is accomplished through shading based on a density model; that is, based on the density (opacity "A") information of the RGBA volume. Thus, an accurate shaded volume is rendered, which shows accurate surfaces and boundaries at region interfaces without sacrificing precision, and being independent of the source of the input volume data.

In accordance with the present inventive method, having determined an RGBA volume, a gradient volume is generated with a gradient vector defined at the center of each voxel in the volume. The RGBA values of each voxel are next multiplied by the length of the gradient vector.

In a second step, one or more mathematical "light sources" are defined with respect to the image volume, and surfaces in the image volume are shaded without sacrificing boundary precision.

Volume Shading

In the preferred embodiment of the present invention, a three-dimensional gradient at the center of each RGBA voxel is computed based on the opacity of neighboring voxels. The gradient volume consists of XYZL voxels, where the X, Y, and Z components represent the change in opacity ($\Delta A$) in each direction along the X, Y, and Z axis, and L represents the vector length, or the magnitude, of the gradient. Each RGBA value of each voxel of the volume under consideration is multiplied by its gradient length L. As a result, surfaces, boundaries and interfaces will become more visible and clearly defined, and solid or uniform regions will become more transparent. As noted previously in the present invention, voxels at a boundary are not thresholded. Rather, they are assigned RGBA values based on voxel material percentage composition and opacity. The calculation of the gradient volume, therefore, is based on high precision RGBA image volume data. The resultant boundary or surface found after determination of the gradient volume has an equally high degree of precision.

Material transitions at surfaces typically occur within voxels, not at voxel boundaries. Thus, Voxels are comprised of material components from both sides of the interface. As described above, RGBA values are assigned to such voxels based on the percentage composition of the materials present in the voxel. However, the relative location of each material within each voxel remains unknown because the RGBA valve 75 uniform for the entire voxel. By calculating a gradient vector for these voxels, the location of material (and correspondingly the location of the boundary) at a subvoxel level may be determined, since the gradient vector of a voxel is perpendicular to the surface of the denser of the materials comprising that voxel.

Volume Density-Based Gradient in Two Dimensions

Figure 8:
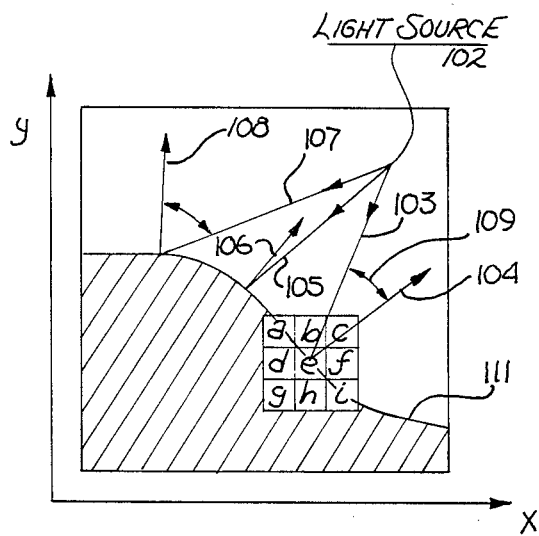
FIG. 8 illustrates the method of generating a gradient vector for a selective voxel in two-dimensional space.

Referring now to FIG. 8, the calculation of a gradient in two dimensions for voxel e is shown. The density based gradient Gl for each voxel in the RGBA volume is generated by calculating the change in opacity value ($\Delta A$) in each direction along the X, Y, and Z, axis of the voxel in its local neighborhood. For example, a voxel that crosses a boundary of two adjacent image volume surfaces, (or of a surface and open space), will have a large gradient Gl, while a voxel in the interior of an object or uniform image volume region will have a small or zero gradient.

The gradient Gl for a given voxel e having neighboring voxels a–h as shown in FIG. 8 is calculated by first computing its gradient in the X direction and then in the Y direction. The gradient in the X direction, Gx may be calculated as follows:

$$Gx(e) = (A(f) - A(d)) + [(A(c) - A(g)) + (A(i) - A(a))] / \sqrt{2}$$

In the Y direction, the gradient Gy is given by:

$$Gy(e) = (A(h) - A(b)) + [(A(g) - A(c)) + (A(i) - A(a))] / \sqrt{2}$$

Thus, the length of the gradient for voxel E, Gl is given by:

$$Gl(e) = \sqrt{[Gx(e)]2 + [Gy(e)]2}$$

For the voxels representing the internal area of a uniform solid object or the like, there is typically little or no change in opacity in the neighborhood of each voxel. In such a case Gl will be small or zero. For voxels that cross a surface boundary or edge location, the change is opacity in the neighborhood of the voxel is typically greatest. Therefore, there will be a resultant boundary or surface. The precision of the resultant boundary after computation of the gradient volume is substantially equal to the precision of the opacity values of the surface or boundary voxels.

A gradient vector Gl is computed for each voxel in the image volume. Referring to FIG. 8, the gradient vector 104 for voxel e is shown. The gradient vector for each voxel is perpendicular to the surface boundary of that particular voxel as shown by gradient vectors 104, 106 and 108.

Figure 9:
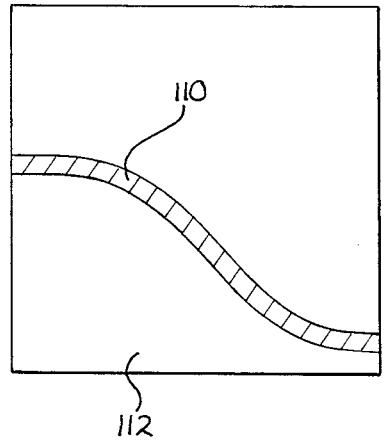
FIG. 9 illustrates a shaded image section, shaded in accordance with the present invention.

The RGBA value of each voxel is multiplied by the length of the gradient vector associated with each such voxel. A new, shaded RGBA, value is thereby determined for each voxel in the image volume. The image can then by displayed using the shaded RGBA values, rather than original RGBA values, in accordance with image reconstruction techniques previously described. The result is an image plane such as that illustrated FIG. 9 having well defined, clearly visible, accurate boundaries. The surface 110 of the volume remains visible but its interior 112, which was opaque prior to determining the gradient, is now more transparent. When the image is reconstructed using the concatenated filter methods described, (and thereby concatenated with subsequent image planes), details previously hidden by the opaque, solid volume interior will become visible where they previously could not be seen.

Volume Gradient in Three Dimensions

Figure 10:
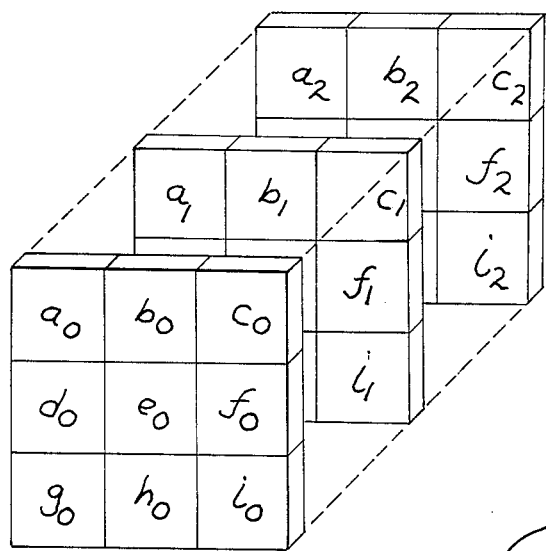
FIG. 10 illustrates the generation of a gradient vector for a selected voxel in three dimensional space.

In two dimensional space, the eight immediate coplanar members of the voxel of interest are used to generate the gradient vector. In three dimensional space, the twenty-six nearest neighboring voxels are utilized. Such an example is shown in FIG. 10, by image planes containing voxels a0–g0, a1–g1 and a2–g2. The voxel of interest in the example of FIG. 10 is voxel e1. The x component of the gradient vector of voxel e1 is generated by the following formula:

$$Gx(e1) = (A(f1) - A(d1)) + [(A(c1) - A(g1)) + (A(i1) -$$
$$A(a1)) + (A(f0) - A(d2)) + (A(f2) - A(d0))]/\sqrt{2} + [(A(i0) -$$
$$A(a2)) + (A(c2) - A(g0)) + (A(i2) - A(a0)) +$$
$$(A(c0) - A(g2))]/\sqrt{3}$$

The $y$ component of the gradient for voxel $e1$ is computed by:
$$Gy(e1) = (A(h1) - A(b1)) + [(A(g1) - A(c1)) + (A(i1) -$$
$$A(a1)) + (A(h0) - A(b2)) + (A(h2) - A(b0))]/\sqrt{2} + [(A(i0) -$$
$$A(a2)) + (A(g0) - A(c2)) + (A(i2) - A(a0)) +$$
$$(A(g2) - A(c0))]/\sqrt{3}$$

The $z$ component is computed by:
$$Gz(e1) = (A(e2) - A(e0)) + [(A(b2) - A(h0)) + (A(h2) -$$
$$A(b0)) + (A(f2) - A(d0)) + (A(d2) - A(f0))]/\sqrt{2} + [(A(i2) -$$
$$A(a0)) + (A(c2) - A(g0)) + (A(a2) - A(i0)) +$$
$$(A(i2) - A(a0))]/\sqrt{3}$$

The length of the gradient in three-dimensional space is then given by:

$$Gl(el) = \sqrt{[Gx(el)]2 + [Gy(el)]2 + [Gz(el)]2}$$

A gradient vector is computed for each voxel in three space. In the preferred embodiment, this is done one scan line at a time. The original RGBA value for each voxel is then multiplied by the length of the gradient vector to generate an RGBA' value for each voxel. As is the case in two space, in three space this operation allows surfaces to remain visible but results in the interiors of solids becoming more transparent. This reveals more detail after the concatonation process is preferred.

Surface Shading

In addition to volume shading, it is often highly desirable to provide accurate surface shading to the projected image volumes of the present invention. To achieve surface shading in accordance with the present invention, a mathematical "light source" is defined at a fixed location with respect to the image volume which thereby illuminates the volume from a selected direction. As a result, certain surface areas of the volume are in shadow, while others (e.g., those facing the light source), are illuminated brightly.

Still referring to FIG. 8, a light source 102 is defined above and to the right of an object surface which includes voxel e. The position of the light source is shown by way of example, but may be located in any desired position. By using a single light source, shadows are generated only on those portions of the image under consideration not facing light source 102. When the shadows produced obscure surface detail undesirably, they may be eliminated or reduced with the use of back lighting and side lighting at user selected levels in the same manner as described for the single light source above.

Still referring to the example of FIG. 8, light source vectors 103, 105 and 107 are defined and shown emanating from light source 102 to each surface voxel of surface 111. While they are shown as being from a local light source, alternatively they could be from a light source originating at an infinite distance such that all light vectors are parallel. The denser (i.e., more opaque) a surface, the less light will pass through the surface. The percentage of incident light that will pass through the surface is a function of the change in density at the local surface region. Further, the shading coefficient is a function of the surface normal.

In the prior art, each pixel is treated as if it is self illuminating. Thus, in the prior art a pixel is visible unless it is obscured or partially obscured by another pixel. In the present invention, pixels do not "radiate" as in prior art models for shading; rather they are illuminated by the mathematical light source. How much light is reflected from the image volume surface a boundary depends on the density of the voxels and the direction of the light source with respect to the voxels normal.

There are various methods to generate a surface shading function. One method is where the cosine of the dot product of light vector L and the gradient vector G is determined. However, such a function does not provide for the application of back lighting and side lighting of the image volume, and is limited to single point lighting.

Therefore, to determine surface shading, a surface shading function is calculated based on the angle (e.g., angle 109) between the light vector 103 and the voxel's gradient vector 104. The larger the angle, the darker the voxel becomes. The present invention uses a surface shading function in which a user determined amount of back and side lighting may be implemented. In the present preferred embodiment of the present invention, shading function Fs is determined such that:

$$Fs = ((((q)(G \cdot L) + r)(G \cdot L) + s)(G \cdot L) + t)(G \cdot L) + u$$

where:
$q = SL - (BL + 1)/2$
$r = (BL - 1)/4$
$s = -2q$
$t = -3r$
$u = SL$ where:
SL is the side lighting value expressed as a decimal fraction;
BL is the backlighting value expressed as a decimal fraction; and
q–u are user determined parameters controlling the amount of back and side lighting.

This same equation is used to determine the shading function Fs for vectors G and L located in two-dimensional space or three-dimensional space.

In addition, it will be understood that the backlighting, side lighting and reference lighting are accomplished mathematically by application of the surface shading function, and not by the use of actual physical sources.

Figure 11:
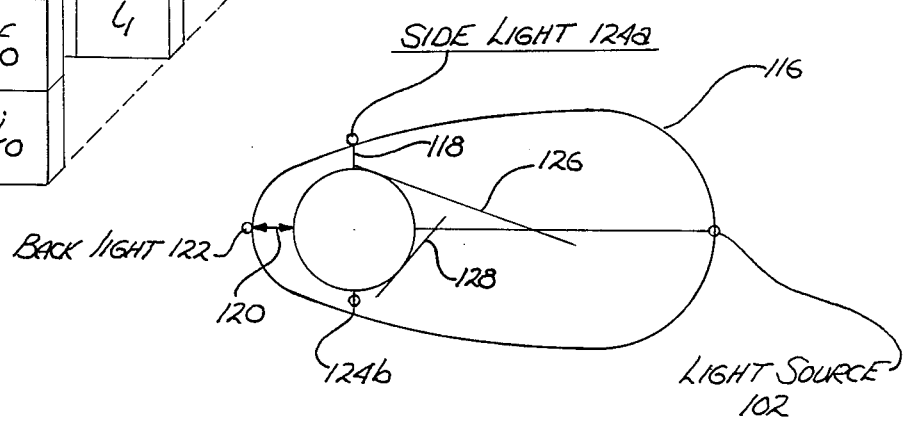
FIG. 11 illustrates the surface shading effect of the present invention.

The effect of the surface shading function on the output image is illustrated by referring to FIG. 11. In FIG. 11, the image under consideration is represented by circle 114. The output image is disposed in ellipse 116 increasing in size from left to right. The ellipse 116 represents the reference lighting on the display image 114. Back lighting and side lighting are used for further image volume and therefore ultimate display image illumination, thereby adjusting surrounding illumination levels and the corresponding level of detail and contrast of the display image.

Backlighting is shown disposed substantially in line with the primary light source 102 but on the other side of the image 114. Backlighting reference point 122 is illustrated in FIG. 11. It may also be desirable to include side lighting such as side lighting reference points 124a and 124b. User determined coefficients q-u of the shading function are functions of the amount of back and side lighting relative to the primary light source 102. In the preferred embodiment, the user determines the amount of backlighting desired, expressed as a decimal fraction of primary light source value 102. For example, where backlighting of a value of 1 is equal in brightness to the primary light source 102, backlighting having a value of 0.5 would be only half as bright as the primary light source, and backlighting of zero value, provides no backlighting component. The same convention is utilized for expressing the value of side lighting brightness.

As backlighting value increases, the distance 120 between the backlight source 122 and the display image 114 increases. Similarly, as the side lighting value increases, the distance 118 between the side light source 124a or 124b from the display image 114 increases.

As a result, a user can customize the shading function for various applications to obtain a greater or lesser amount of back and side lighting to control the harshness of the image produced.

The surface shading of the present invention is more accurate than prior art methods because the previously calculated gradient vector G1 is used to determine surface and boundary locations to subvoxel accuracy. The surface shading function is calculated using the relationship between the gradient vector and the light vector. Thus, accurate surface shading results.

Figure 2:
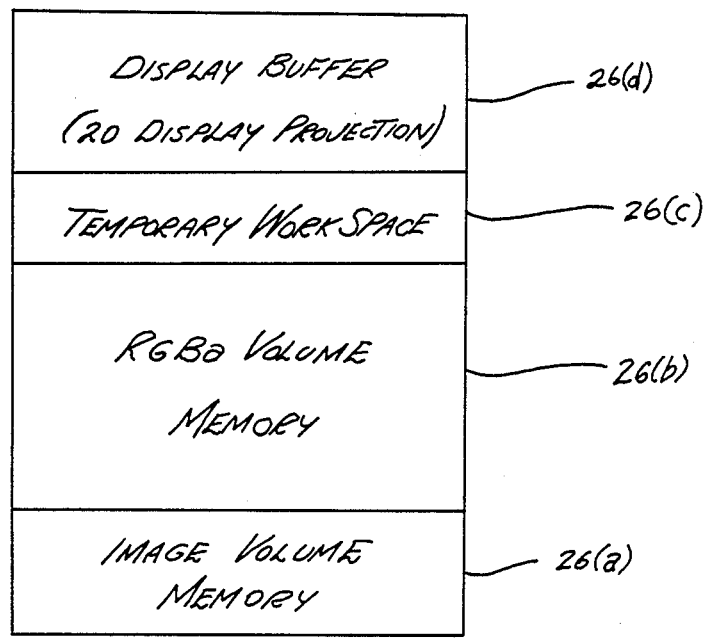
FIG. 2 is a block diagram illustrating the division of the picture memory of the present invention.

Referring to FIGS. 1 and 2, the volume shading process occurs after the RGBA volume memory 26b has been created. A scan line of voxels is outputted from picture memory 26 and inputted to the channel processor 16 through Pbus 24. Opacity values for neighboring voxels for each pixel are also inputted to the channel processor 16 and the gradients in the X, Y and Z direction are calculated as previously described. After the X, Y and Z gradient values are calculated for each voxel, the length of the gradient is calculated and this information is inputted from the channel processing 16 to XYZL gradient volume memory 26f of picture memory 26.

For surface shading, a light vector L is generated for each voxel and stored in temporary work space 26c of picture memory 26. Utilizing user determined coefficients inputted by the host computer 10, the surface shading function is calculated and channel processor 16 is utilized to determine the surface shading function. The resultant data is used to generate the RGBA shaded volume memory 26e of picture memory 26. The RGBA shaded volume memory may then be displayed in a two dimensional display utilizing the concatonation method described above with respect to images stored in RGBA volume memory 26b.

FIG. 12 is a flow chart illustrating the method of the present invention for shading and illuminating voxels of an image volume. Steps 130-133 describe gradient shading and steps 134-137 describe voxel illumination. Initially, color and opacity values are defined for each voxel at step 130. The color values consist of red, blue and green values (RGB) representing the percentage composition of each color present in each voxel. The opacity value, A, is a numerical value representing the opaqueness or transparency of the voxel.

The next step 131 is the calculation of the change in opacity across each voxel in relation to its immediate neighbors in coordinate directions. This change in opacity value is used to generate a gradient vector at step 132. Finally, at step 133, the RGBA values of each voxel is multiplied by the magnitude of the gradient vector for that voxel.

If desired, the image volume can be illuminated by a user defined light source or sources. At step 134, a light source is defined in space relative to the image volume or voxel under consideration. Step 135 consists of defining a light vector between each voxel and the light source. In step 136, a shading function is defined by combining the light vector and the gradient vector as outlined above. At step 137, the RGBA values of each voxel are multiplied by the shading function to achieve surface shading.

We claim:

1. A method of generating a two dimensional rendering from three dimensional volume data comprising the steps of:

providing a first image volume, said first image volume representing said three dimensional data set;

storing said first image volume in a first image memory as a plurality of homogeneous storage arrays, each array comprising a plurality of planes having a plurality of volume elements (voxels);

generating a second image volume from said first image volume by combining one of said planes of voxels with the next consecutive of said planes of voxels along a selected path;

repeating the prior step for each consecutive of said planes of voxels with each generated combination image volume through the nth plane of voxels where n represents the total number of said planes of voxels;

said combination image volume having voxels whose color and opacity values are based on the percentage composition of the color and opacity values of voxels contained in combined planes of voxels;

defining a gradient vector G for each said voxel, said gradient vector representative of the change in opacity across each voxel relative to neighboring voxels disposed adjacent said voxel, said gradient vector being normal to an inferred surface at said voxel, and having a greater magnitude for a voxel identifying a surface than for a voxel identifying a solid;

multiplying the color and opacity values of each voxel by the magnitude of said gradient of each voxel;

providing said voxels of said combination image volume to a display means whereby a surface of an image volume is determined and is capable of display on said display means.

2. The method of claim 1 wherein said first image volume is converted to a plurality of digital signals and stored in a digital memory.

3. The method of claim 1 wherein said color values comprise a red component, a green component and a blue component.

4. The method of claim 3 wherein said combination image volume is generated in a channel processor wherein said red, blue and green components and said opacity values are combined in first, second, third and fourth channels respectively.

5. The method of claim 1 wherein the color and opacity value of each voxel of a combination image volume is given by:

$$FG + (1 - (FG)(A))(BG)$$

where;
$FG$ = the color and opacity components of a voxel of one of said scan lines;
$A$ = the opacity of said voxel of one of said scan lines;
$BG$ = the composite color and opacity components of the corresponding voxel in previously combined scan lines.

6. In a computer system, a method of deriving a surface of a volume element (voxel) having color and opacity values, said voxel having a plurality of neighboring voxels disposed adjacent to said voxel, said method comprising the steps of:
defining a gradient vector G for said voxel representative of the amount of change in opacity across said voxel relative to said neighboring voxels, said gradient vector being normal to an inferred surface at said voxel, said gradient vector having a magnitude, said magnitude being greater for a voxel identifying a surface than for a voxel identifying a solid;
deriving a surface of said voxel by multiplying said color and opacity values of said voxel by said magnitude of said gradient vector of said voxel;
whereby a non-binary surface contribution of a voxel is determined to subvoxel accuracy and is capable of display on a display means.

7. The method of claim 1 wherein the magnitude of said gradient is found by:

$$Gl = \sqrt{[Gx]2 + ][Gy]2}$$

where $Gx$ = the change in opacity across said voxel in the x direction and $Gy$ represents the change in opacity across said voxel in the y direction of an xy coordinate system.

8. The method of claim 7 wherein Gx is defined by:

$$Gx = (A(f) - A(d)) + [(A(c) - A(g)) + (A(i) - A(a))]/\sqrt{2}$$

where $A(d)$, $A(f)$ represent the opacity of said neighboring voxels to said voxel in the X direction; and
$A(c)$, $A(g)$, $A(i)$, $A(a)$ represent the opacity of the nearest coplanar neighboring voxels diagonal from said voxel.

9. The method of claim 8 wherein the y component of said gradient vector is given by:

$$Gy = (A(h) - A(b)) + [(A(g) - A(c)) + (A(i) - A(a))]/\sqrt{2}$$

where $A(h)$, $A(b)$ represent the opacity of the nearest voxels to said voxel in the Y direction.

10. The method of claim 1 wherein the length of said gradient vector is given by:

$$Gl = \sqrt{[Gx]2 + [Gy]2 + [Gz]2}$$

where $G(x)$ represents the change in opacity across said voxel in the X direction, $G(y)$ represents the change in opacity across said voxel in the Y direction and $G(z)$ represents the change in opacity across said voxel in the Z direction of an XYZ coordinate system.

11. The method of claim 10 wherein the x component of said gradient vector is given by:

$$Gx(e1) = (A(f1) - A(d1)) + [(A(c1) - A(g1)) + (A(i1) -$$

$$A(a1)) + (A(f0) - A(d2)) + (A(f2) - A(d0))]/\sqrt{2} + [(A(i0) -$$

$$A(a2)) + (A(c2) - A(g0)) + (A(i2) - A(a0)) +$$

$$(A(c0) - A(g2))]/\sqrt{3}$$

where $A(f1)$, $A(d1)$ represent the nearest coplanar voxels to said voxel in the X direction;
$A(i1)$, $A(a1)$, $A(c1)$, $A(g1)$ represent the nearest coplanar voxels diagonal to said voxel in the X plane;
$A(d0)$, $A(f0)$, $A(d2)$, $A(f2)$ represent the nearest coplanar diagonal voxels to said voxel in the Y plane;
$A(i0)$, $A(a2)$, $A(c2)$, $A(g0)$, $A(i2)$, $A(a0)$, $A(c0)$, $A(g2)$ represent the opacities of the nearest neighboring voxels diagonal to said voxel.

12. The method of claim 11 wherein said y component of said gradient is given by:

$$Gy(e1) = (A(h1) - A(b1)) + [(A(g1) - A(c1)) + (A(i1) -$$

$$A(a1)) + (A(h0) - A(b2)) + (A(h2) - A(b0))]/\sqrt{2} + [(A(i0) -$$

$$A(a2)) + (A(g0) - A(c2)) + (A(i2) - A(a0)) +$$

$$(A(g2) - A(c0))]/\sqrt{3}$$

where $A(h1)$, $A(b1)$ represent the opacity of the nearest neighboring coplanar voxels in the Y direction to said voxel;
$A(h0)$, $A(b2)$, $A(b0)$, $A(h2)$ represent the opacity of the nearest coplanar diagonal voxels to said voxel in the Z direction.

13. The method of claim 12 wherein the z component of said gradient vector is given by:

$$Gz(e1) = (A(e2) - A(e0)) + [(A(b2) - A(b2)) - (A(h0) +$$

$$A(h2) - A(b0)) + (A(f2) - A(d0)) + (A(d2) -$$

$$A(f0))]/\sqrt{2} + [(A(i2) - A(a0)) + (A(c2) -$$

$$A(g0)) + (A(a2) - A(i0)) + (A(i2) - A(a0))]/\sqrt{3}$$

where $A(e2)$, $A(e0)$ represent the opacity of the nearest coplanar voxels in the Z direction.

14. The method of claim 1 further including the step of surface shading said voxel, said surface shading accomplished by the steps of:
defining a location of a light source;
defining a light vector L for said voxel;
generating a shading function by combining said light vector and said gradient vector;
multiplying the color and opacity values of said voxel by said shading function;
said shading function defined by:

$$((((q)(G \cdot L) + r)(G \cdot L) + s)(G \cdot L) + t)(G \cdot L) + u$$

where
$q = SL - (BL + 1)/2$
$r = (BL - 1)/4$
$s = 2q$
$t = 3r$
$u = SL$
$SL$ = the amount of side lining utilized to shade said voxel
$BL$ = the percentage of back lining used to shade said voxel.

* * * * *